(12) United States Patent
Huizar Rodriguez et al.

(10) Patent No.: US 7,996,190 B2
(45) Date of Patent: Aug. 9, 2011

(54) VIRTUAL CABLING ROUTER

(75) Inventors: Francisco R. Huizar Rodriguez, Jalisco (MX); Gabriel A. Vallarta Santos, Jalisco (MX)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 11/583,321

(22) Filed: Oct. 19, 2006

(65) Prior Publication Data

US 2008/0154551 A1    Jun. 26, 2008

(51) Int. Cl.
    *G06F 17/50*       (2006.01)
(52) U.S. Cl. ............................................ 703/1
(58) Field of Classification Search ................. 703/1
    See application file for complete search history.

(56) References Cited

U.S. PATENT DOCUMENTS

| | | | | |
|---|---|---|---|---|
| 6,272,150 | B1 * | 8/2001 | Hrastar et al. ............... | 370/486 |
| 6,426,952 | B1 * | 7/2002 | Francis et al. ............... | 370/380 |
| 6,706,965 | B2 * | 3/2004 | Kato et al. .................... | 174/36 |
| 2004/0059539 | A1 | 3/2004 | Otsuki et al. | |
| 2004/0231875 | A1 * | 11/2004 | Rasmussen et al. ............ | 174/50 |
| 2005/0232299 | A1 * | 10/2005 | Binder .......................... | 370/463 |
| 2006/0004543 | A1 | 1/2006 | Vogel et al. | |
| 2007/0078635 | A1 * | 4/2007 | Rasmussen et al. ............ | 703/1 |

OTHER PUBLICATIONS

Gausemeier et al., "Integrated Prototyping Gives Visible Support in Product Development", Source: Industrie Management, vol. 4, No. 5, 1998, pp. 13-19, Germany.

* cited by examiner

*Primary Examiner* — Paul L Rodriguez
*Assistant Examiner* — Andre Pierre Louis
(74) *Attorney, Agent, or Firm* — Hoffman Warnick LLC

(57) ABSTRACT

A solution for enhancing the identification and selection of cabling for a system, such as a computer system, is provided, which includes provisions for a virtual cabling router. As aspect of the invention provides a method of identifying cabling for a system, wherein the method comprises: identifying a placement of the plurality of components in at least one enclosure, using a virtual representation; creating a routing layout for the virtual representation, based on the placement; and identifying the cabling based on the routing layout.

18 Claims, 7 Drawing Sheets

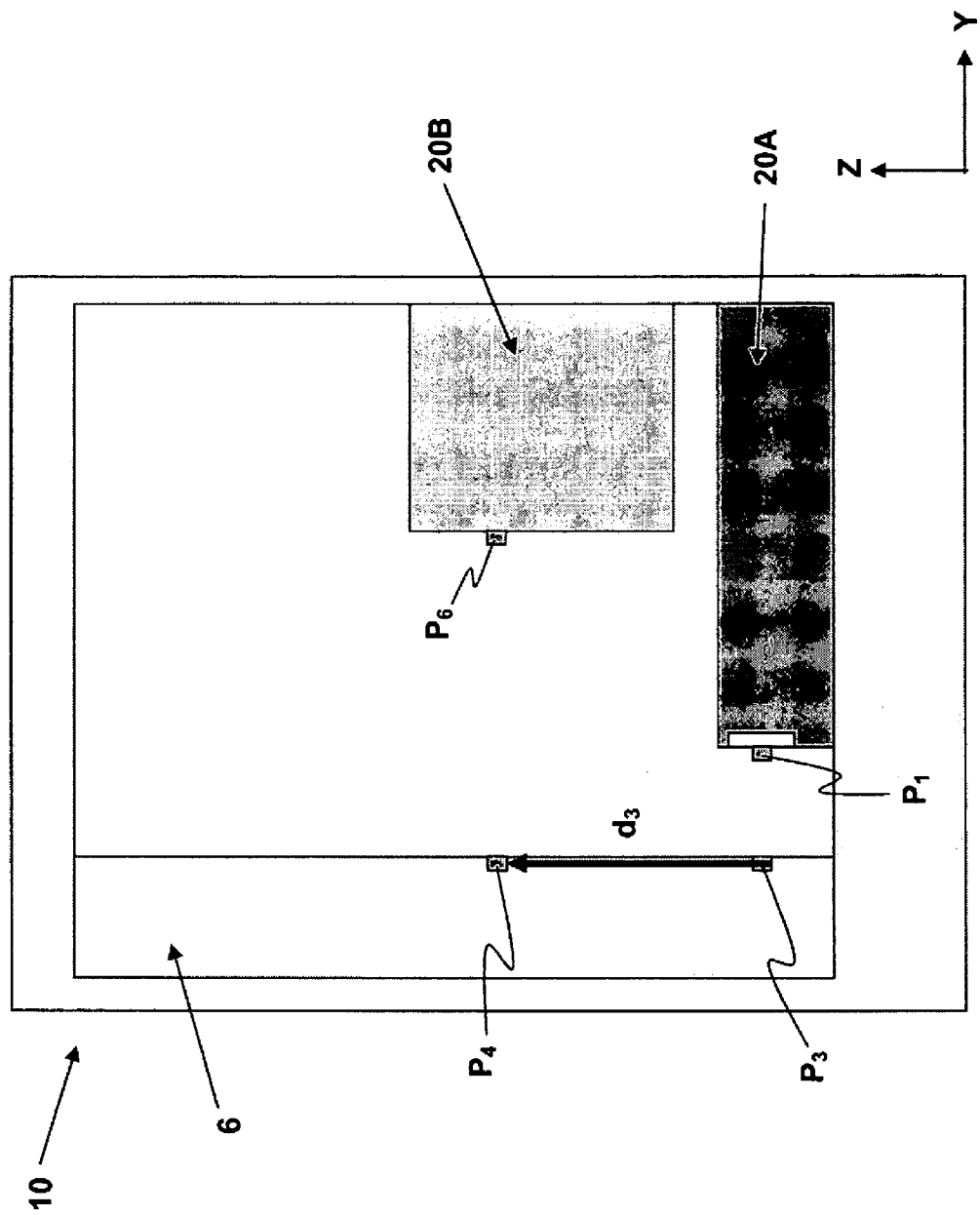

VIRTUAL CABLING ROUTER

FIELD OF THE INVENTION

The invention relates generally to methods of cable routing, and more particularly, to a virtual cabling router.

BACKGROUND OF THE INVENTION

Marketing personnel, who are responsible for selling equipment such as computer equipment like e-server systems, e.g., xSeries, typically rely on skilled technical teams when a client orders a suite solution of rack cabinets with systems interconnected. Usually, the technical team selects and obtains the proper cables with the proper lengths based on the actual, physical distance between the devices to be interconnected. Once this is done, a cable list is given to the marketing team that requested the solution. In this manner, the marketing team can complete the order selecting the correct cable part numbers, where each part number corresponds to a different cable length, type and cost.

Response to the client suffers under this scenario since the technical team's only option is to subsequently go to a lab and obtain all the components (e.g., I/O devices, routers, servers, etc.) which conform to the client solution; manually place the various components of the systems within the rack cabinets; and then, once construction of the suite solution is done, select the proper cable lengths that fit to the physically constructed system.

Additionally, besides doing the physical placement of the components and manually connecting the systems, the technical people must consider other conditions and factors for installing proper cabling such as: if the rack cabinets are placed side by side or are separated by an empty space; if the cable(s) can cross between the rack cabinet walls; if the client suite owns a raised (e.g., "fake") floor for guiding the cables between the rack cabinets; if the system to connect specifies a unique exit point for all cables (e.g., cable management arm); if the system can be moved forward once installed in a rack cabinet; if the cable must follow the rack cabinet wall as a guiding path or can go directly between devices to get a shorter distance; and, if the connection must be made on the rear or in front of the rack cabinet, depending on the connector position. This scenario is inefficient with regard to time, cost, and/or resources.

In view of the foregoing, a need exists to overcome one or more of the deficiencies in the related art.

BRIEF SUMMARY OF THE INVENTION

The invention provides a solution for enhancing the identification and/or selection of cabling for a system, such as a computer system, which includes provisions for a virtual cabling router.

A first aspect of the invention provides a computerized method of identifying cabling for a system that includes a plurality of components, the method comprising: identifying a placement of the plurality of components in at least one enclosure, using a virtual representation; creating a routing layout for the virtual representation, based on the placement; and identifying the cabling based on the routing layout.

A second aspect of the invention provides a system for identifying cabling for a system that includes a plurality of components, the system comprising: a system for identifying a placement of the plurality of components in at least one enclosure, using a virtual representation; a system for creating a routing layout for the virtual representation, based on the placement; and a system for identifying the cabling based on the routing layout.

A third aspect of the invention provides a computer program stored on a computer-readable medium, which when executed, enables a computer system to identify cabling for a system that includes a plurality of components, the computer program comprising program code for enabling the computer system to: identify a placement of the plurality of components in at least one enclosure; create a routing layout based on the placement; and identify the cabling based on the routing layout.

A fourth aspect of the invention provides a method for deploying an application for identifying cabling for a system that includes a plurality of components, comprising: providing a computer infrastructure being operable to: identify a placement of the plurality of components in at least one enclosure, using a virtual representation; create a routing layout for the virtual representation, based on the placement; and identify the cabling based on the routing layout.

A fifth aspect of the invention provides computer software embodied in a propagated signal for identifying cabling for a system that includes a plurality of components, the computer software comprising instructions to cause a computer system to perform the following functions: identifying a placement of the plurality of components in at least one enclosure, using a virtual representation; creating a routing layout for the virtual representation, based on the placement; and identifying the cabling based on the routing layout.

A sixth aspect of the invention provides a business method for identifying cabling for a system that includes a plurality of components, the business method comprising managing a computer system that performs the process described herein; and receiving payment based on the managing.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIG. 1C shows a side elevation of the virtual enclosure in FIG. 1A.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention address various shortcomings by employing a virtual cabling router that considers all the necessary physical attributes of components included in a system to obtain a distance between the components involved in the desired connections for later selecting the proper cable lengths, avoiding the necessity of doing the consuming job of physically getting the components, placing them, selecting the cables that matches the connection and connecting with a cable that reaches the distance.

In an embodiment, by doing this job virtually, performance in generating an order will be increased on both teams—marketing and technical—which will also increase the satisfaction of the client when providing a quicker and reliable response with the final order.

The virtual cabling router may emulate a virtual three-dimensional (3D) coordinate space for obtaining and/or moving to specific 3D points between components. Each component involved in the desired connection will "decide" what direction the cabling will follow for obtaining and/or moving to another 3D point. The virtual cabling router also may employ a system of "containers", wherein once the directional decision has been made the containers take the responsibility of deciding the next direction for obtaining and/or moving to a new and sequential 3D point—there is no limit in the number of containers involved in the cabling routing. This process is repeated until both components being virtually interconnected get to the same 3D container space.

The results obtained by the virtual cabling router may be employed for any system that requires cabling. For example, the router may be used for cabling in a computer system having enclosure(s) and a plurality of computer components. Similarly, the cabling, for example, could be used to connect components in a building, a vehicle, a computer suite, or any electronic system.

Figure 1A:
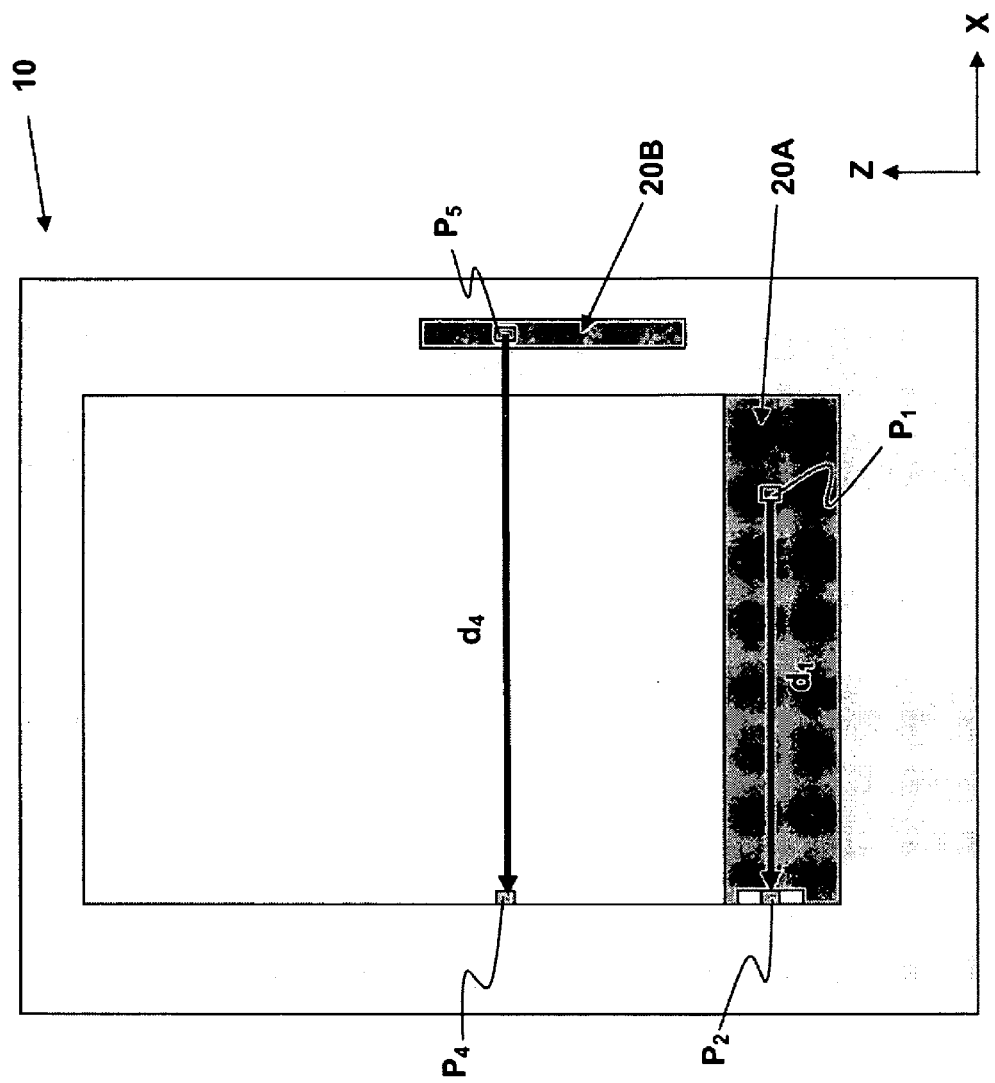
FIG. 1A shows a front view of a virtual enclosure according to an embodiment of the invention.
Figure 1B:
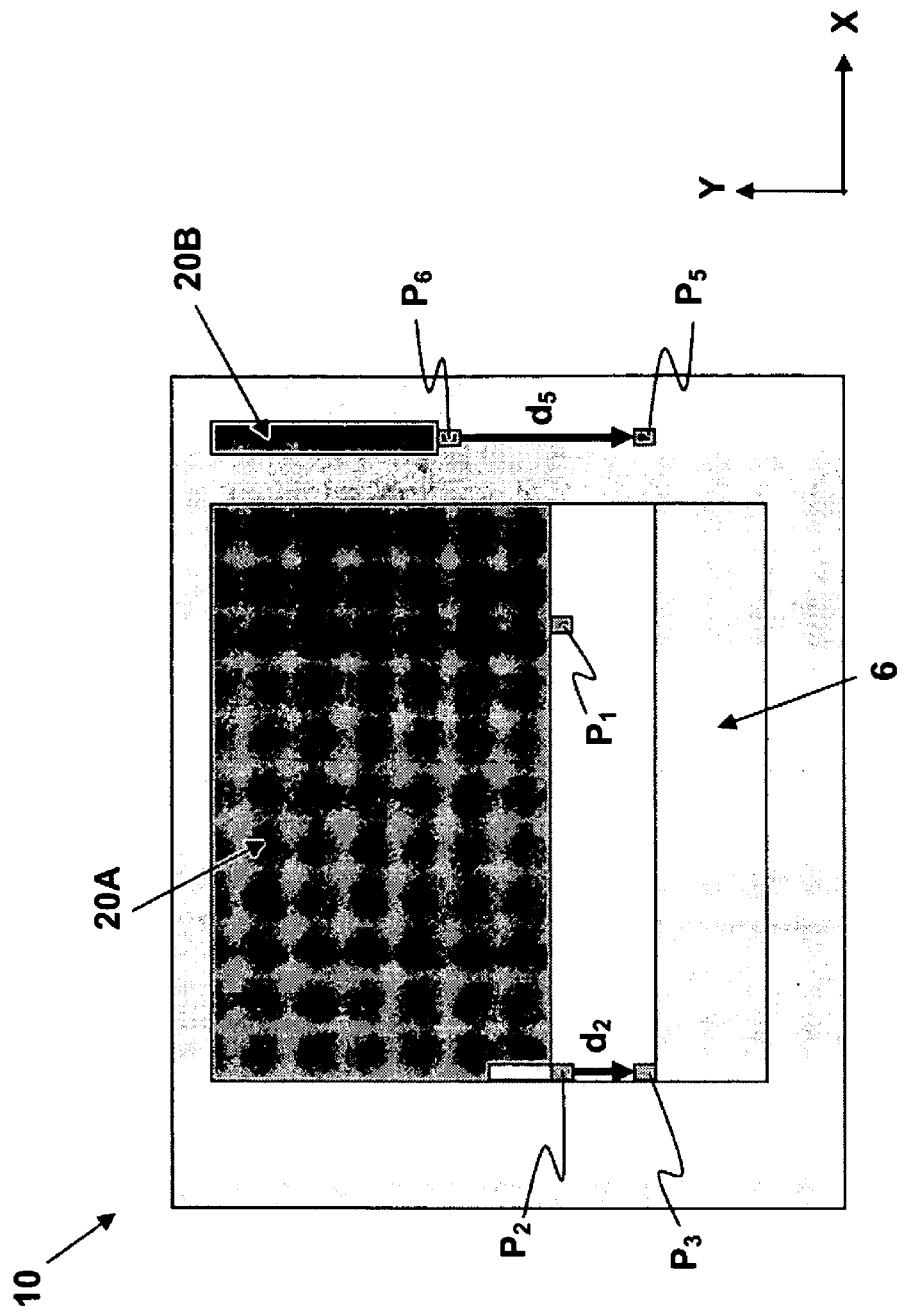
FIG. 1B shows a top view of the virtual enclosure in FIG. 1A.

Turning to the figures, FIGS. 1A, 1B, and 1C show elevation, top, and side elevation views, respectively, of a virtual 3D coordinate space for using a virtual cabling router, according to an embodiment of the present invention. As shown, an enclosure 10 and two components 20A, 20B therein are virtually emulated. The two components 20A, 20B require suitable cabling to interconnect them. The first component 20A (e.g., switch) is emulated such that $P_1$ (FIG. 1A) is a cabling connection point for the first component 20A. Similarly, the emulated cabling connection point for the second component 20B (e.g., router) is $P_6$ (FIG. 1B). Thus, the router will create a routing layout for ultimately connecting $P_1$ to $P_6$, and identify cabling in response to the routing layout(s) created.

Under aspects of the present invention, once the cabling connection points (e.g., $P_1$, $P_6$) of the components 20A, 20B are determined, then the virtual cabling router will virtually connect the two cabling connection points, in a virtual 3D coordinate space. While virtually moving along the various coordinate axes (i.e., X, Y, Z), the virtual cabling router will additionally calculate the respective distances of each move.

As the embodiment in FIGS. 1A through 1C depict, the virtual cabling router may start a virtual cabling route from both the first cabling connection point (e.g., $P_1$) and from the second cabling connection point (e.g., $P_6$), and concurrently move from both $P_1$ and $P_6$, over the virtual 3D coordinate space, until both cabling routes meet and reach each other in the same "container", thereby creating a single routing layout from first component 20A to second component 20B.

In so doing, the virtual cabling router first moves from $P_1$ to $P_2$, along the X-axis, wherein $P_2$ is the first component's 20A unique cabling exit point, thereby obtaining a distance $d_1$ between the two virtual points (i.e., $P_1$, $P_2$). In parallel, and/or concurrently, the router also moves from $P_6$ which is the connection point for the second container 20B, along the Y-axis, to virtual point $P_5$, (FIG. 1B) wherein $P_5$ is the nearest point from $P_6$ along any of the axes. Upon the move, the router obtains a distance $d_5$ between the two virtual points (i.e., $P_5$, $P_6$).

From $P_2$, the router moves, along the Y-axis, to virtual point $P_3$, (FIG. 1B) wherein $P_3$ is the nearest point from $P_2$ along any of the axes, yet within the common container area 6. Upon the move, the router obtains a distance $d_2$ between the two virtual points (i.e., $P_2$, $P_3$). So too does the router move from $P_5$, along the X-axis, to virtual point $P_4$ (FIG. 1A), wherein $P_4$ is the nearest point from $P_5$ along any of the axes, yet within the common container area 6. Upon the move, the router obtains a distance $d_4$ between the two virtual points (i.e., $P_4$, $P_5$).

As shown in FIG. 1C, now both virtual routes are in the common container 6 (i.e., at virtual points $P_3$ and $P_4$). Thus, the router can connect the virtual routing between remaining virtual points $P_3$ and $P_4$, by moving along the Z-axis (FIG. 1C), and thereby obtaining distance $d_3$ between the two virtual points (i.e., $P_3$, $P_4$).

Once all virtual connecting points (e.g., $P_1$, $P_2$, $P_3$, $P_4$, $P_5$, $P_6$) are obtained and all distances (e.g., $d_1$, $d_2$, $d_3$, $d_4$, $d_5$) are obtained, the router calculates the distance, D, between each point using one of the following equations:

$$D_{ab} = \text{abs}((x_b - x_a) + (y_b - y_a) + (z_b - z_a)) \qquad \text{Eq. 1.1}$$

$$D_{ab} = ((x_b - x_a) + (y_b - y_a)^2 + (z_b - z_a)^2)^{1/2} \qquad \text{Eq. 1.2}$$

Equation 1.1 is to be utilized if the cabling must, for example, go through a wall(s) of the enclosure(s) 10. Conversely, equation 1.2 may be used if the cabling may go directly between components 20. By the applicable equation, the distance between any two points may be obtained.

Figure 2:
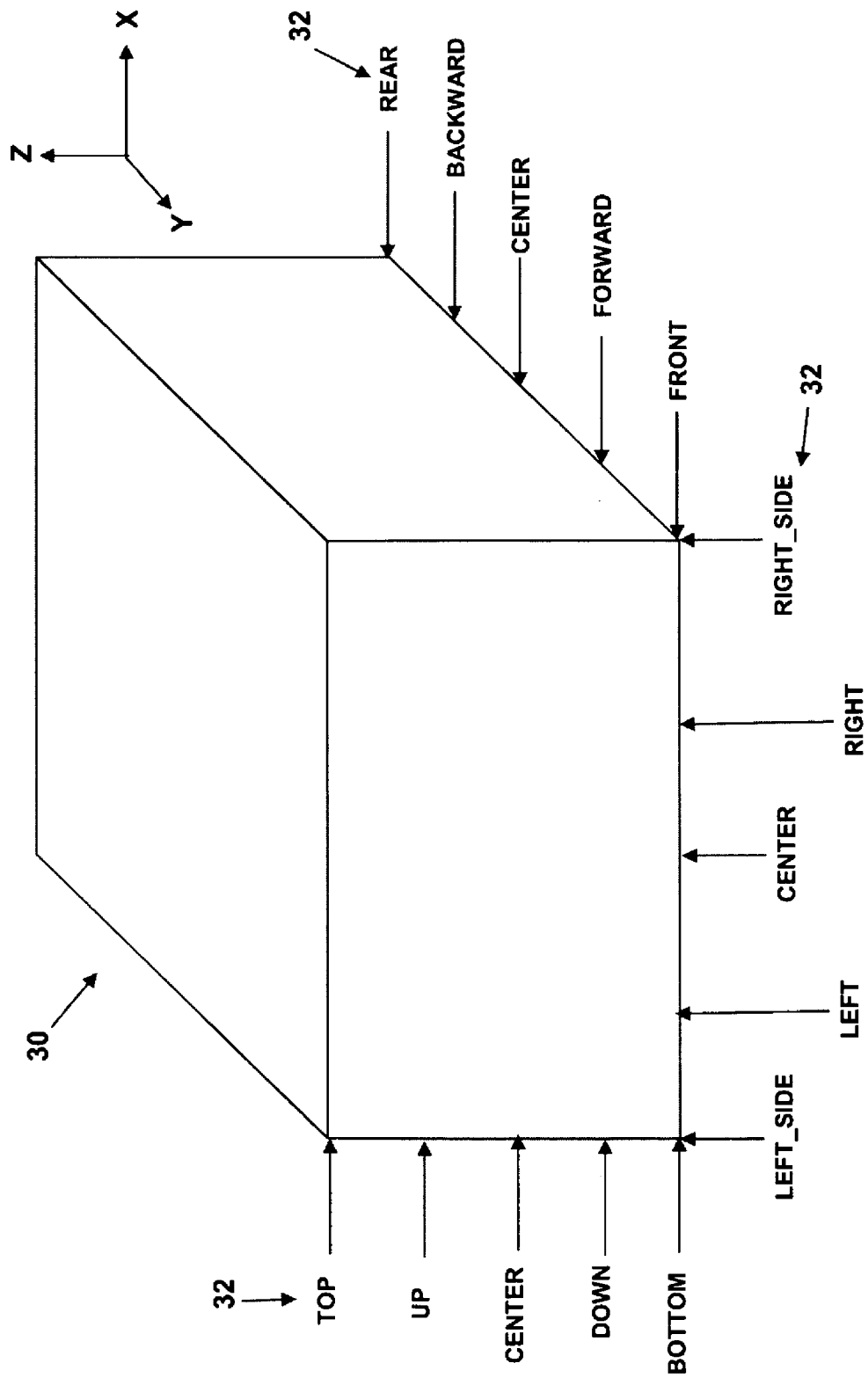
FIG. 2 shows a front perspective view of a second embodiment of a virtual enclosure according to an embodiment of the invention.

Referring to FIG. 2, the router may emulate a simulated component 30 having a grid for the emulated distribution of connection. For example, various terms 32 may be used to decide a point for building a cabling connection path. Thus, along the X-axis (i.e., width), the terms 32 may include "Left_Side", "Left", "Center", "Right", and "Right_Side". Conversely, along the Y-axis (i.e., depth), the terms 32 may include "Rear", "Backward", "Center", "Forward", and "Front". Finally, along the Z-axis (i.e., height), the terms 32 may include "Top", "Up", "Center", "Down", and "Bottom".

Data may be kept in a database for use by the virtual cabling router to enable proper functioning. For example, physical properties of all components 20 may be stored therein. The physical properties may include dimensions, forward extension, connector(s) position based on the simulated grid in FIG. 2, and/or the like.

The data may include information related to enclosure(s) 10 such as distances and/or dimensions of various compartments. For example, information may be based on a reference point located to the front, right, and bottom of the container. The term compartment herein means an area within an enclosure 10 that another component 20 may be installed.

The data may include information related to a required exit point for all cabling for a particular enclosure 10. The required exit point from the enclosure 10 may be the point that all components 20 in the enclosure 10 will take as the direction as the path to follow for cabling. For example, the exit point may be located on the right or left of the particular enclosure 10.

The data may include information related to whether, or not, the cabling may pass through any walls of the enclosure 10. Alternatively, if cabling may not pass through the walls of the enclosure 10, the cabling will be routed through the floor.

The data may include information related to cabling properties, including, for example, length, and whether cabling must follow the walls of the enclosure 10 or if the cabling may cross directly any space in the enclosure 10.

The virtual cabling router determines the various directions that the cabling should take based on considering a variety of factors. Factors may include, for example, if the component 20 has an exit point (e.g., cable management arm), in which case the cabling follows the direction of the exit point. Another factor is, if there is no exit point, then the cabling follows the shortest distance to the wall of the container. Another factor is checking whether the container "owns" a required exit point for the cabling to follow, otherwise the cabling continues the routing path as selected previously. Another factor is verifying whether the 3D points are in the same space coordinate.

The virtual cabling router verifies if a virtual cabling reaches a requisite distance. First, the virtual cabling router calculates the distance using either equation 1.1 or 1.2 as stated above. Once calculated, other adjustments to the calculated distance are considered and incorporated, if applicable. The adjustments may include considering whether a component 20 may be moved (e.g., forward) once installed. If so, this moving distance is added to the calculated distance. Another adjustment includes considering whether a raised (e.g., fake) floor is employed in the installation and if the cabling reaches the raised floor. If so, the distance to the raised floor is added. Another adjustment includes adding any gap distances between components 20 (if applicable). The calculated distance, D, is thusly adjusted via the various requisite adjustments, thereby obtaining an adjusted distance, $D_{rev}$. The virtual cable router compares the adjusted distance, $D_{rev}$, with a selected cabling to verify that the distance is met.

Figure 3:
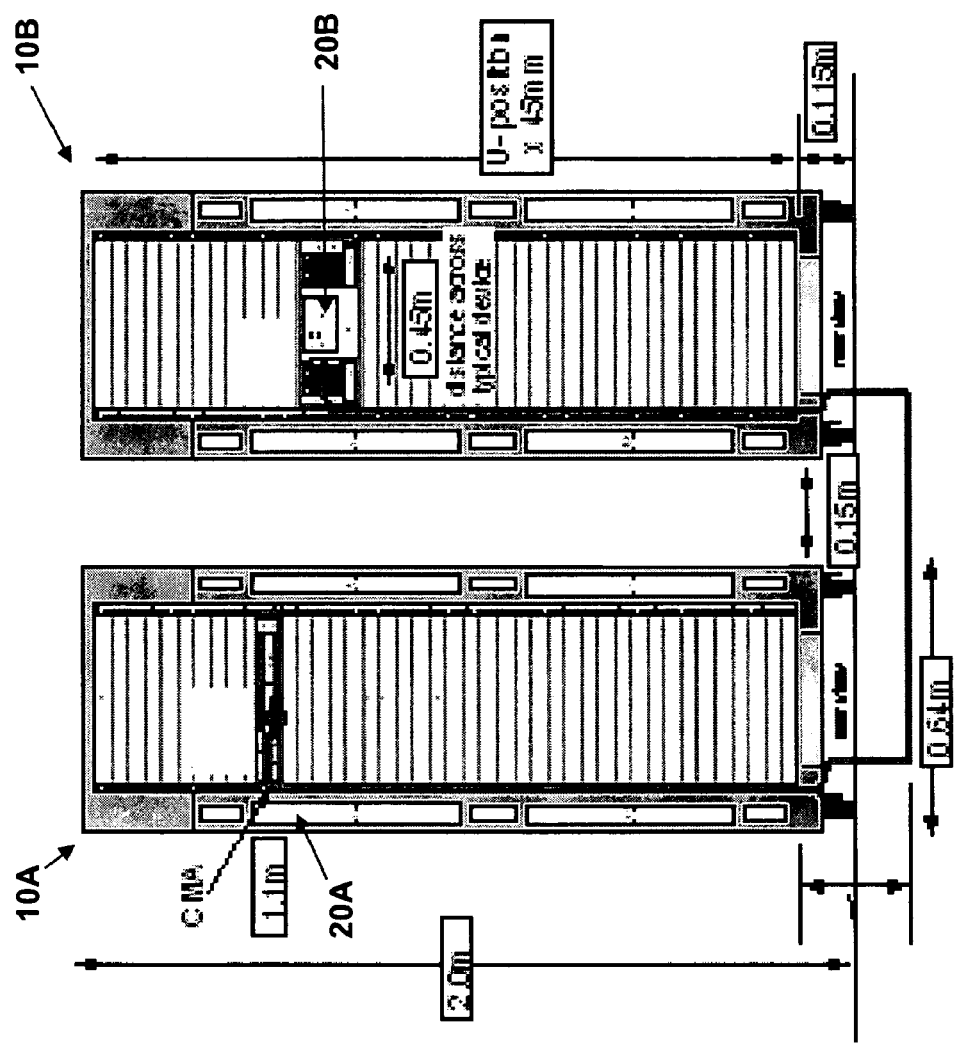
FIG. 3 shows a front elevation of two enclosures according to a third embodiment of the invention.

FIG. 3 depicts another embodiment of a prospective computer system for which a technical user requires adequate cabling. In the example shown, the computer system includes two components (e.g., servers) 20A, 20B, each in different enclosure (e.g., rack cabinet) 10A, 10B. The rack cabinets 10A, 10B are separated by an empty space and there is a raised floor under the rack cabinets 10A, 10B.

The virtual cabling router calculates and creates a routing layout for cabling. Considerations for the routing layout include: components' 20A, 20B dimensions and location within the enclosures 10A, 10B; the connector's position and relation to any cable management arm; distance between enclosures 10A, 10B and distance to the raised floor; whether cabling must follow walls of the room; whether components 20A, 20B may be moved forward for connection; and/or the like.

Thus, in the embodiment in FIG. 3, the enclosures 10A, 10B for consideration include server 20A, residing in the first rack cabinet 10A, from where the cabling will exit and server 20B, residing in the second rack cabinet 10B, that will receive cabling for completing the cabling connection.

Other considerations include distance between rack cabinets 10A, 10B (i.e., 0.15 m), distance to the raised floor, and distance that a component 20A, 20B may be moved forward, once connected and supported.

In any event, the virtual cabling router creates a routing layout and identifies cabling that complies with the routing layout. Optionally, the technical user may select the cabling and fill a list that can be provided to the marketing team for completing the order. In this manner, the entire task is completed without doing the layout physically, thereby saving time, costs, and/or resources such as obtaining devices, using a lab, building a solution, and testing various cable lengths.

Figure 4:
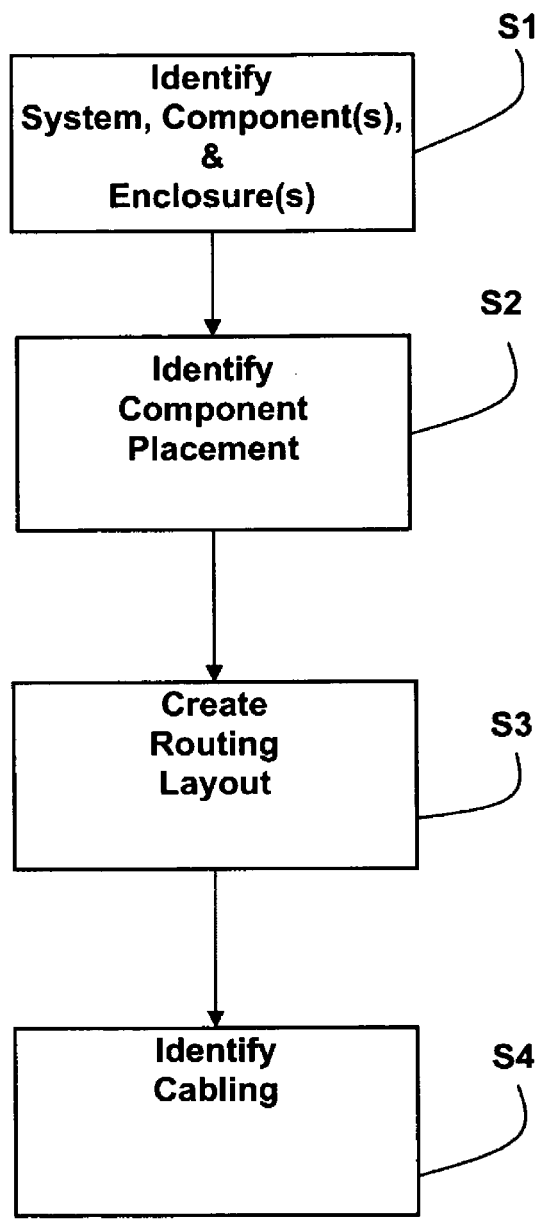
FIG. 4 shows a flowchart of a method of identifying cabling for a system according to an embodiment of the invention.

FIG. 4 depicts a flowchart of a method 90 of identifying cabling for a system in accordance with an embodiment of the present invention. Process S1 includes identifying a system (e.g., computer system), including all the components (e.g., computer components) 20 (FIGS. 1A-1C, 3) and the enclosure(s) 10 (FIGS. 1A-1C, 3) that are part of the system that requires cabling. The identifying in process S1 may be based on an order for the system.

Process S2, includes identifying a placement of the components 20 in at least one enclosure 10. The placement will include consideration of the various attributes of the components 20, enclosure 10, room, and/or the like.

Process S3, includes creating a routing layout based on the placement. The routing layout may also include consideration of the various attributes of the components 20, enclosure 10, room, and/or the like.

Process S4, includes identifying cabling based on the routing layout, so as to comply with the routing layout. The cabling identifying may also include at least one of: determining cabling attributes, determining cabling connectors, and/or determining cabling terminators. Other optional processes of the method 90 may include ordering and/or installing cabling in accordance with the routing layout and the cabling identified in process S4.

Figure 5:
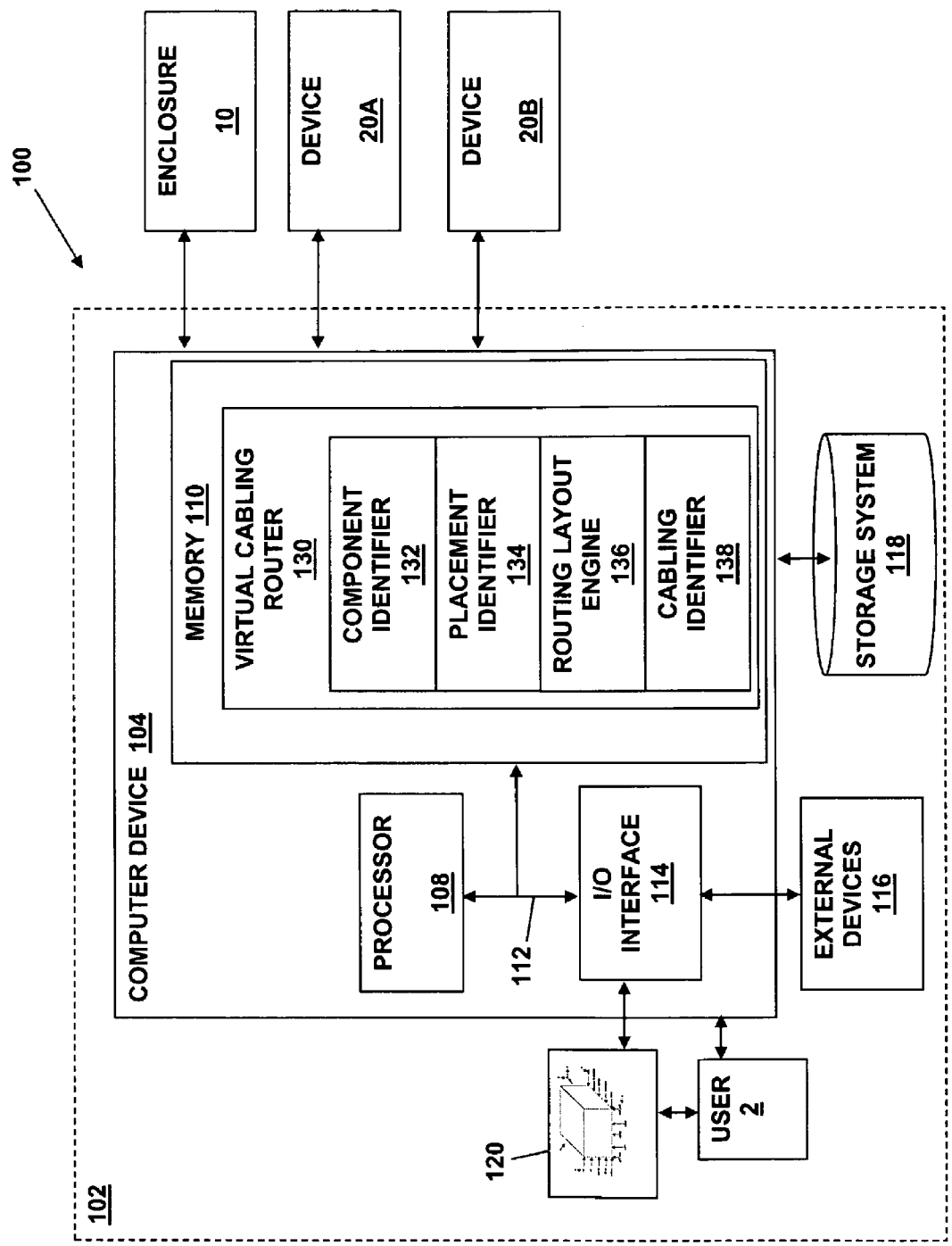
FIG. 5 shows an illustrative computer environment for a virtual cabling router according to an embodiment of the invention.

Turning to FIG. 5, an illustrative environment 100 having a computer system 102 for performing the process described herein is shown. Computer system 102 includes a computer device 104 that is shown including a processor 108, a memory 110, an input/output (I/O) interface 114, and a bus 112. Further, computer device 104 is shown in communication with an external I/O device/resource 116 and a storage system 118. In general, processor 108 executes program code, such as virtual cabling router 130, which is stored in a storage system, such as memory 110 and/or storage system 118. While executing program code, processor 108 can read and/or write data to/from memory 110, storage system 118, and/or I/O interface 114. Bus 112 provides a communications link between each of the components in computer device 104. I/O interface 114 can comprise any device that transfers information between a user 2 and/or another computing device and computer device 104. To this extent, I/O interface 114 can comprise a user I/O device to enable user 2 to interact with computer device 104 and/or a communications device to enable external device 116 to communicate with computer device 104 using any type of communications link.

In any event, computer device 104 can comprise any general purpose computing article of manufacture capable of executing program code installed thereon. However, it is understood that computer device 104, and virtual cabling router 130 are only representative of various possible equivalent computing devices that may perform the process described herein. To this extent, in other embodiments, the functionality provided by computer device 104 and virtual cabling router 130 can be implemented by a computing article of manufacture that includes any combination of general and/or specific purpose hardware and/or program code. In each embodiment, the program code and hardware can be created using standard programming and engineering techniques, respectively.

Similarly, computer system 102 is only illustrative of various types of computer systems for implementing the invention. For example, in one embodiment, computer system 102 comprises two or more computing devices 104 that communicate over any type of communications link to perform the process described herein. Further, while performing the process described herein, one or more computing devices 104 in computer system 102 can communicate with one or more other computing devices external to computer device 104 using any type of communications link. In either case, the communications link can comprise any combination of various types of wired and/or wireless links; comprise any combination of one or more types of networks; and/or utilize any combination of various types of transmission techniques and protocols.

As discussed herein, virtual cabling router 130 enables computer device 104 to identify cabling for a system, such as a client's computer system. To this extent, virtual cabling router 130 is shown including a component identifier 132, a placement identifier 134, a routing layout engine 136, and a cabling identifier 138. The component identifier 132 may identify a system, such as a client's computer system, and the enclosure(s) 10, and the plurality of devices (e.g., 20A, 20B) that may require cabling connecting there between. The placement identifier 134 may identify the placement of the plurality of devices 20A, 20B as discussed herein. The routing layout engine 136 may create a cabling routing layout in response to the placement identification. The cabling identifier 138 identifies the cabling for the particular system (e.g., devices 20A, 20B, enclosure 10) in response to the cabling routing layout created by the routing layout engine 136. However, it is understood that some of the various systems shown in FIG. 5 can be implemented independently, combined, and/or stored in memory of one or more separate computing devices that are included in computer device 104. Further, it is understood that some of the systems and/or functionality may not be implemented, or additional systems and/or functionality may be included as part of computer device 104. Regardless, an embodiment of the invention provides a solution for routing cabling for a system.

While shown and described herein as a method and system for identifying cabling, it is understood that the invention further provides various alternative embodiments. For example, in one embodiment, the invention provides a computer program stored on a computer-readable medium, which when executed, enables a computer system to identify cabling for a system. To this extent, the computer-readable medium includes program code, such as virtual cabling router 130 (FIG. 5), which implements the process described herein. It is understood that the term "computer-readable medium" comprises one or more of any type of tangible medium of expression (e.g., physical embodiment) of the program code. In particular, the computer-readable medium can comprise program code embodied on one or more portable storage articles of manufacture, on one or more data storage portions of a computing device, as a data signal traveling over a network (e.g., during a wired/wireless electronic distribution of the computer program), on paper (e.g., capable of being scanned and converted to electronic data), and/or the like.

In another embodiment, the invention provides a method of deploying/generating a system for identifying cabling for a system. In this case, a computer system, such as system 102 (FIG. 5), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computer device 104 (FIG. 5), from a computer-readable medium; (2) adding one or more computing devices to the computer system; and (3) incorporating and/or modifying one or more existing devices of the computer system, to enable the computer device 104 to perform the process described herein.

In still another embodiment, the invention provides a business method that performs the process described herein on a subscription, advertising, and/or fee basis. That is, a service provider, such as an Application Integrator, could offer to identify cabling for a system as described herein. In this case, the service provider can manage (e.g., create, maintain, support, etc.) a computer system, such as computer device 104 (FIG. 5), that performs the process described herein for one or more customers. In return, the service provider can receive payment from the customer(s) under a subscription and/or fee agreement, receive payment from the sale of advertising to one or more third parties, and/or the like.

As used herein, it is understood that "program code" means any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as some or all of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of identifying cabling for a system that includes a plurality of components, the method comprising:
   identifying a placement of the plurality of components in at least one enclosure, using a virtual representation by determining cabling attributes, determining cabling connectors, and determining cabling terminators using a computer;
   creating a three-dimensional cabling routing layout for the virtual representation from a first component to a second component, based on the placement using the computer, the three-dimensional cabling routing layout including a first axis, a second axis, and a third axis, wherein creating the cabling routing layout includes concurrently routing a first cable route from the first component and routing a second cable route from the second component until the first and second cable routes meet within a common container within the at least one enclosure, wherein the routing is from one point to another point within the enclosure such that the first and second cable routes meet within the common container when the first and second cable routes include the same first and second axis and connect along the third axis; and
   identifying the cabling based on the cabling routing layout using the computer, wherein the identifying includes calculating a distance between each of the points.

2. The method of claim 1, further comprising installing the cabling in accordance with the cabling routing layout.

3. The method of claim 2, wherein the installing further comprises installing the cabling in one selected from a group consisting of: a building, a vehicle, a computer suite, and an electronic system.

4. The method of claim 1, wherein the system is a computer system and the plurality of components are a plurality of computer components and the cabling is data cabling between the plurality of computer components.

5. The method of claim 1, further comprising identifying the plurality of components based on an order for the system.

6. The method of claim 1, wherein the cabling routing layout includes at least one of: a routing layout for connecting an adapter to at least one I/O device or a routing layout for connecting a plurality of enclosures.

7. The method of claim 1, wherein the identifying the cabling includes calculating at least one of: a quantity of enclosures required to install the components or a size of at least one enclosure required to install each of plurality of components.

8. The method of claim 1, wherein the at least one enclosure is a rack cabinet.

9. The method of claim 1, wherein the plurality of components includes at least one selected from a group consisting of: a server, a power distribution unit (PDU), an uninterruptible power supply (UPS), a monitor, and a switch.

10. A system for identifying cabling for a system that includes a plurality of components, the system comprising:
 a system for identifying a placement of the plurality of components in at least one enclosure, using a virtual representation by determining cabling attributes, determining cabling connectors and determining cabling terminators;
 a system for creating a three-dimensional cabling routing layout for the virtual representation from a first component to a second component, based on the placement, the three-dimensional cabling routing layout including a first axis, a second axis, and a third axis, wherein creating the three-dimensional cabling routing layout includes concurrently routing a first cable route from the first component and routing a second cable route from the second component until the first and second cable routes meet within a common container within the at least one enclosure, wherein the routing is from one point to another point within the enclosure such that the first and second cable routes meet within the common container when the first and second cable routes include the same first and second axis and connect along the third axis; and
 a system for identifying the cabling based on the cabling routing layout, wherein the identifying includes calculating a distance between each of the points.

11. The system of claim 10, further comprising a system for installing the cabling in accordance with the cabling routing layout.

12. The system of claim 10, wherein the plurality of components are a plurality of computer components and the cabling is data cabling between the plurality of computer components.

13. The system of claim 10, further comprising a system for identifying the plurality of components based on an order for the system.

14. The system of claim 10, wherein the cabling routing layout includes at least one of: a routing layout for connecting an adapter to at least one I/O device or a routing layout for connecting a plurality of enclosures.

15. The system of claim 10, wherein the system for identifying the cabling includes a system for calculating at least one of: a quantity of enclosures required to install the plurality of components and a size of at least one enclosure required to install each of the plurality of components.

16. The system of claim 10, wherein the at least one enclosure is a rack cabinet.

17. The system of claim 10, wherein the plurality of components includes at least one selected from a group consisting of: a server, a power distribution unit (PDU), an uninterruptible power supply (UPS), a monitor, and a switch.

18. A computer program product stored on a non-transitory computer-readable medium, which when executed, enables a computer system to identify cabling for a system that includes a plurality of components, the computer program product comprising program code for enabling the computer system to:
 identify a placement of the plurality of components in at least one enclosure by determining cabling attributes, determining cabling connectors and determining cabling terminators;
 create a three-dimensional cabling routing layout based on the placement from a first component to a second component, the three-dimensional cabling routing layout including a first axis, a second axis, and a third axis, wherein creating the three-dimensional cabling routing layout includes concurrently routing a first cable route from the first component and routing a second cable route from the second component until the first and second cable routes meet within a common container within the at least one enclosure, wherein the routing is from one point to another point within the enclosure such that the first and second cable routes meet within the common container when the first and second cable routes include the same first and second axis and connect along the third axis; and
 identify the cabling based on the cabling routing layout, wherein the identifying includes calculating a distance between each of the points.

* * * * *